(12) United States Patent
Kawatani (10) Patent No.: US 12,415,326 B2
(45) Date of Patent: Sep. 16, 2025

(54) PUNCTURE REPAIR LIQUID UNIT AND PUNCTURE REPAIR KIT

(71) Applicant: Sumitomo Rubber Industries, Ltd., Kobe (JP)

(72) Inventor: Akihiko Kawatani, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 434 days.

(21) Appl. No.: 17/961,719

(22) Filed: Oct. 7, 2022

(65) Prior Publication Data

US 2023/0140616 A1 May 4, 2023

(30) Foreign Application Priority Data

Oct. 28, 2021 (JP) .................................. 2021-176795

(51) Int. Cl.
*B29C 73/02* (2006.01)
(52) U.S. Cl.
CPC .................................. *B29C 73/025* (2013.01)
(58) Field of Classification Search
CPC ........................................................ B29C 73/025
USPC ............................................................ 141/37
See application file for complete search history.

(56) References Cited

U.S. PATENT DOCUMENTS

2005/0284536 A1* 12/2005 Kojima ................ B67D 7/0266
141/38
2017/0274605 A1* 9/2017 Nagata .................. F16K 15/048

FOREIGN PATENT DOCUMENTS

EP 1419876 A2 * 5/2004 .......... B29C 73/166
JP 2018-192667 A 12/2018

OTHER PUBLICATIONS

EP 1419876 A2-English Translation (Year: 2004).*

* cited by examiner

*Primary Examiner* — Craig M Schneider
*Assistant Examiner* — Christopher M Afful
(74) *Attorney, Agent, or Firm* — Birch, Stewart, Kolasch & Birch, LLP (57) ABSTRACT

A puncture repair liquid unit and a puncture repair kit each has an extraction cap and a container. The extraction cap has a first flow path, a second flow path, and a third flow path. The first flow path extends between a first inlet connectable to an external compressor device for generating compressed air and a first outlet opening in the container. The second flow path extends between a second inlet opening in the container and a second outlet for taking out a puncture repair liquid from the extraction cap to supply to a punctured tire to be repaired. The second inlet communicates with the first outlet via the space of the container. The third flow path communicates with the first and second flow paths outside the space of the container so that a portion of the compressed air in the first flow path flows into the second flow path.

20 Claims, 6 Drawing Sheets

PUNCTURE REPAIR LIQUID UNIT AND PUNCTURE REPAIR KIT

RELATED APPLICATIONS

This application claims the benefit of foreign priority to Japanese Patent Applications No. JP2021-176795, filed Oct. 28, 2021, which are incorporated by reference in its entirety.

FIELD OF THE INVENTION

The present disclosure relates to a puncture repair liquid unit and a puncture repair kit.

BACKGROUND OF THE INVENTION

Japanese Unexamined Patent Application Publication No. 2018-192667 (Patent Document 1) has disclosed a bottle unit for puncture repair. This bottle unit has a bottle container containing puncture repair liquid and a cap attached to the mouth of the bottle container.

The cap has a first flow path and a second flow path. The first flow path has a first opening portion open in the bottle container to feed compressed air from a compressor into the bottle container. The second flow path has a second opening portion open in the bottle container to sequentially taking out the puncture repair liquid and the compressed air from the bottle container by feeding compressed air.

SUMMARY OF THE INVENTION

However, with the bottle unit described above, a portion of the puncture repair liquid tends to harden near the valve of the punctured tire to be repaired, and the compressed air supply path is partially blocked, which causes a problem of requiring a lot of time to supply compressed air to the tire.

The present disclosure was made in view of the above, and a primary object thereof is to provide a puncture repair liquid unit capable of reducing the time required to supply compressed air to a punctured tire.

The present disclosure is a puncture repair liquid unit including a container containing a puncture repair liquid in a space inside the container, and an extraction cap fixed to a mouth of the container, wherein the extraction cap is provided with a first flow path, a second flow path, and a third flow path, the first flow path extends between a first inlet connectable to an external compressor device for generating compressed air and a first outlet opening in the container, the second flow path extends between a second inlet opening in the container and a second outlet for taking out the puncture repair liquid from the extraction cap to supply to a punctured tire to be repaired, the second inlet communicates with the first outlet via the space of the container, and the third flow path communicates with the first flow path and the second flow path outside the space of the container so that a portion of the compressed air in the first flow path flows into the second flow path.

It is possible that the puncture repair liquid unit of the present disclosure shortens the time required to supply compressed air to a punctured tire by adopting the above configuration.

DETAILED DESCRIPTION OF THE INVENTION

An embodiment of the present disclosure will now be described in conjunction with accompanying drawings. It must be understood that the drawings may contain exaggerations or representations different from the actual dimensional ratios of the structure to aid in understanding the contents of the disclosure. Further, throughout the embodiments, identical or common elements are designated by the same reference signs, and redundant explanations are omitted. Furthermore, the embodiments and the specific configurations represented in the drawings are for the purpose of understanding the contents of the present disclosure, and the present disclosure is not limited to the specific configurations shown in the drawings.

(Puncture Repair Kit)

Figure 1:
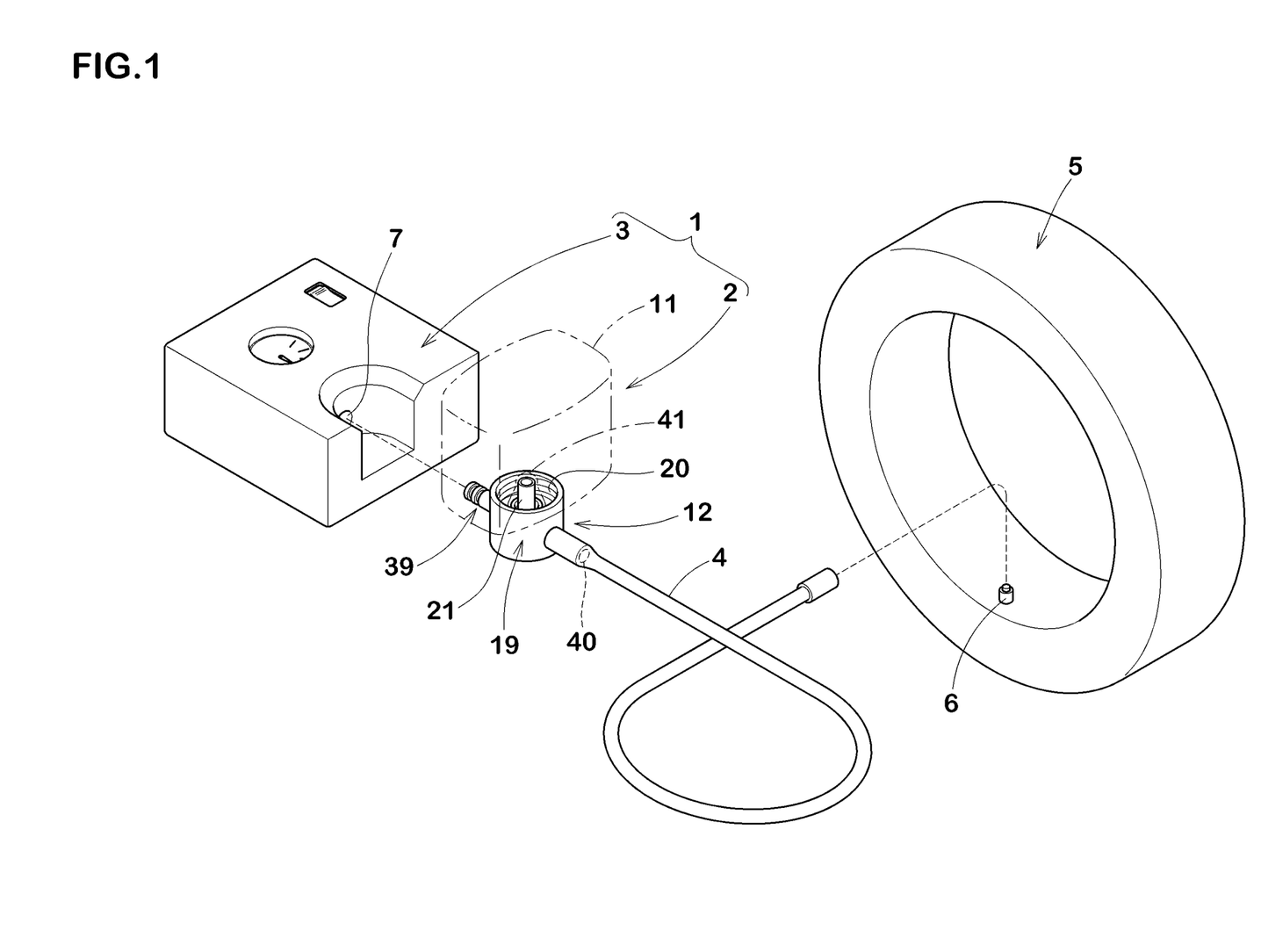
FIG. 1 is a perspective view illustrating a puncture repair kit of the present embodiment in use.

FIG. 1 is a perspective view showing a usage state of a puncture repair kit 1 of the present embodiment. The puncture repair kit 1 of the present embodiment includes a puncture repair liquid unit 2 and a compressor device 3.

In the puncture repair kit 1 of the present embodiment, the puncture repair liquid unit 2 and the compressor device 3 are connected at the time of puncture repair, for example. Further, in the present embodiment, one end of a hose 4 is connected to the puncture repair liquid unit 2, for example. The other end of the hose 4 is connected to a valve 6 of a punctured tire (i.e., flat tire) 5 to be repaired.

(Compressor Device)

The compressor device 3 of the present embodiment is for generating compressed air, and a known one can be employed, for example. In the compressor device 3 of the present embodiment, compressed air (e.g., about 300 to 400 kPa) is generated by the operation of a built-in motor (not shown), for example. The generated compressed air is discharged from a compressed air outlet 7 connectable to the puncture repair liquid unit 2.

(Puncture Repair Unit (First Embodiment))

Figure 2:
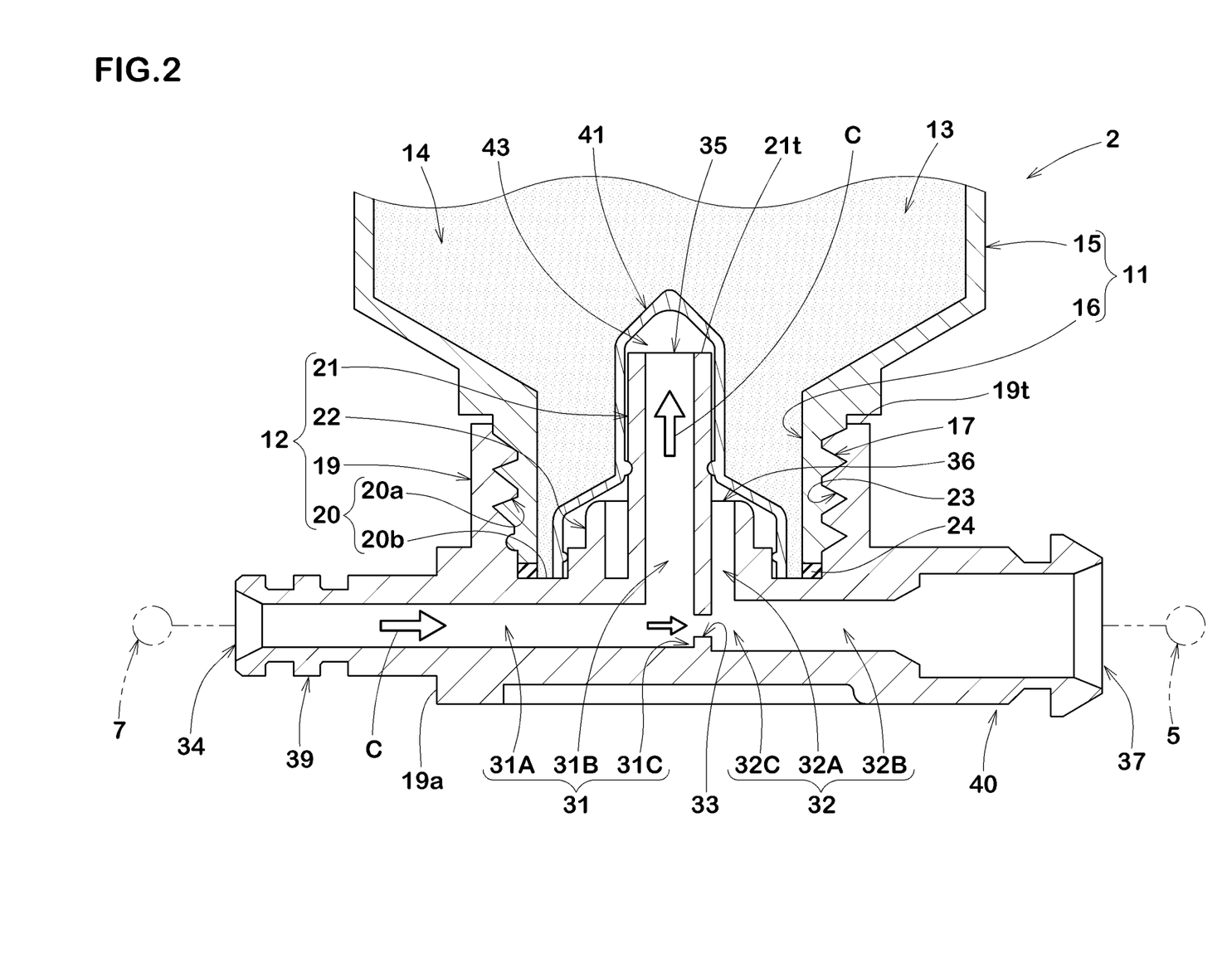
FIG. 2 is a partial cross-sectional view of a puncture repair unit of the present embodiment.

The puncture repair liquid unit 2 of the present embodiment has a container 11 and an extraction cap 12. FIG. 2 shows a cross-sectional view of the container 11 and the extraction cap 12. In the present embodiment, the configuration of the puncture repair liquid unit 2 is described in a reference posture in which a mouth 16 of the container 11 faces downward.

(Container)

The container 11 of the present embodiment contains puncture repair liquid 14 in a space 13 inside the container 11. The container 11 of the present embodiment is configured to include a body portion 15 and the mouth 16 as in the above-mentioned Patent Document 1.

The body portion 15 of the present embodiment is formed in a cylindrical shape. The mouth 16 of the present embodiment protrudes from the end portion (lower end) of the body portion 15. The outer peripheral surface of the mouth 16 has an external thread 17.

(Extraction Cap)

The extraction cap 12 of the present embodiment includes a base portion 19, a recessed portion 20, a boss portion 21, and a rib portion 22.

(Base Portion and Recessed Portion)

As shown in FIG. 1, the base portion 19 of the present embodiment is formed in a cylindrical shape centered around an axial center (not shown) extending in the vertical direction, for example. As shown in FIGS. 1 and 2, the recessed portion 20 of the present embodiment is recessed from one end (upper end) (19*t*) of the base portion 19. The recessed portion 20 of the present embodiment has an inner peripheral surface (20*a*) and a bottom surface (20*b*), and is formed in a concave columnar shape centered on the above-mentioned axial center (not shown), for example.

The inner peripheral surface (20*a*) of the recessed portion 20 in the present embodiment is provided with an internal thread 23 into which the external thread 17 of the container 11 can be screwed. By screwing the external thread 17 into this internal thread 23, the extraction cap 12 is fixed to the mouth 16 of the container 11. The bottom surface (20*b*) of the recessed portion 20 may be provided with a packing material 24 for sealing the end of the mouth 16.

(Boss Portion)

The boss portion 21 of the present embodiment protrudes from the bottom surface (20*b*) of the recessed portion 20 toward the container 11 (upward in FIG. 2) in the container 11. One end (upper end, protruding end) (21*t*) of the boss portion 21 in the present embodiment is arranged on the container 11 side (upper side) of the one end (19*t*) of the base portion 19.

The boss portion 21 of the present embodiment is arranged substantially in the center of the recessed portion 20, and is formed in a cylindrical shape centered on an axial center (not shown) extending in the vertical direction, for example. The boss portion 21 of the present embodiment is formed concentrically with the recessed portion 20, for example.

Figure 3:
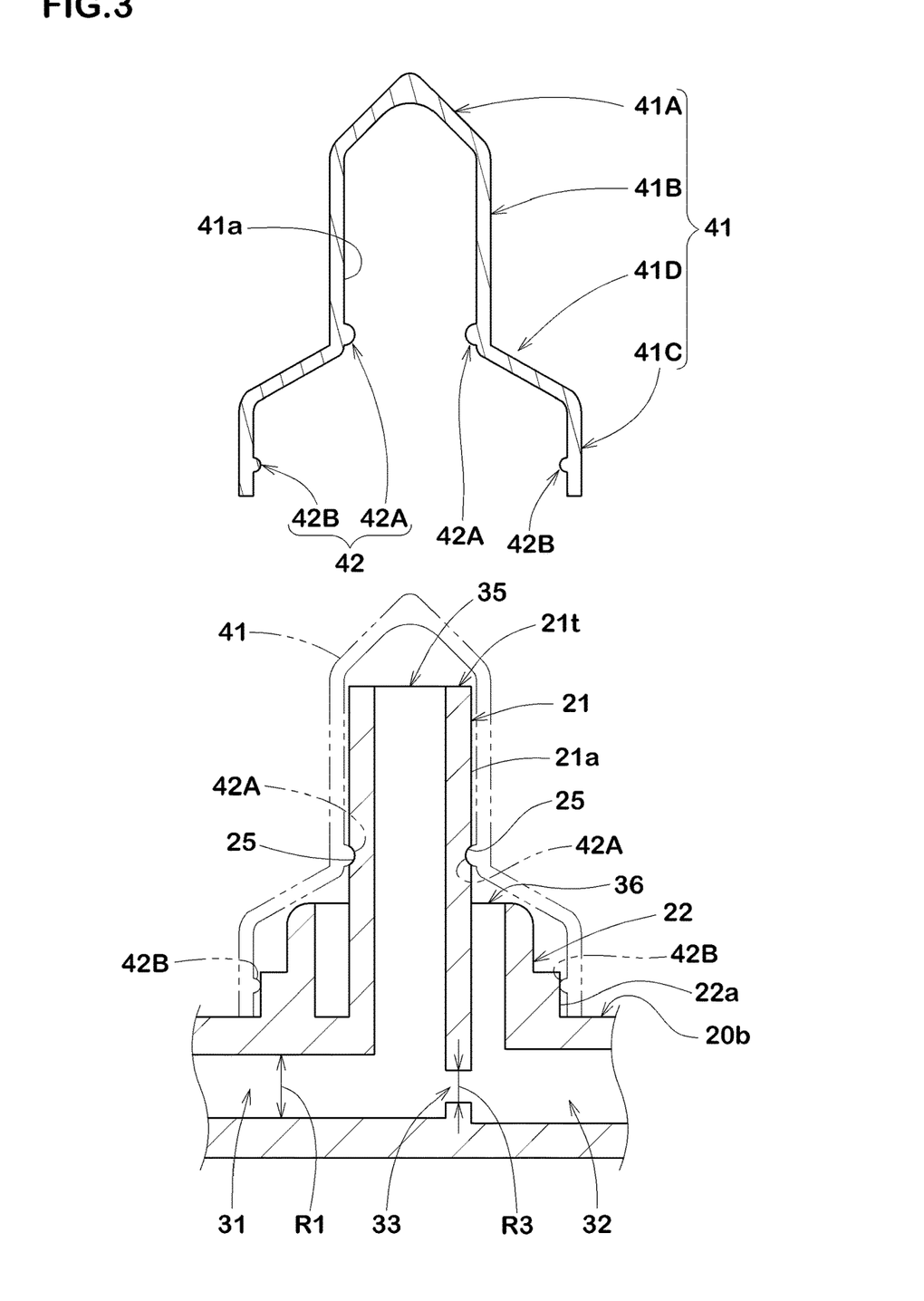
FIG. 3 is an exploded and enlarged view of FIG. 2.

FIG. 3 is an exploded enlarged view of FIG. 2. The boss portion 21 of the present embodiment has an outer peripheral surface (21*a*) provided with a concave groove 25 recessed inward in the radial direction of the boss portion 21. The concave groove 25 of the present embodiment is formed continuously in the circumferential direction of the boss portion 21, for example.

(Rib Portion)

As shown in FIG. 2, the rib portion 22 of the present embodiment protrudes from the bottom surface (20*b*) of the recessed portion 20 toward the container 11 (upward in FIG. 2) in the container 11. The rib portion 22 of the present embodiment is arranged so as to surround the outer peripheral surface (21*a*) (shown in FIG. 3) of the boss portion 21 and is formed in a ring shape (cylindrical shape) centered on an axial center (not shown) extending in the vertical direction, for example. The rib portion 22 of the present embodiment is formed concentrically with the recessed portion 20 and the boss portion 21, for example. The boss portion 21 and the rib portion 22 may be collectively referred to as a first cylindrical portion.

The extraction cap 12 of the present embodiment includes a first flow path 31, a second flow path 32, and a third flow path 33.

(First Flow Path)

The first flow path 31 of the present embodiment extends between a first inlet 34 and a first outlet 35. The first inlet 34 is connectable to the compressed air outlet 7 of the compressor device 3 that generates compressed air (C). The first outlet 35 is open in the container 11.

The first inlet 34 in the present embodiment is formed on a first nozzle portion 39 protruding from an outer peripheral surface (19*a*) of the base portion 19, for example. This first inlet 34 (first nozzle portion 39) is connected to the compressed air outlet 7 (shown in FIG. 1) of the compressor device 3.

The first outlet 35 of the present embodiment is formed as a hole opened at the one end (upper end) (21*t*) of the boss portion 21, for example. With the first inlet 34 and the first outlet 35 configured as such, the first flow path 31 of the present embodiment can supply the compressed air (C) generated by the compressor device 3 to the container 11 by allowing the compressed air (C) to flow from the first inlet 34 to the first outlet 35.

The first flow path 31 of the present embodiment includes a first portion 31A and a second portion 31B. The first portion 31A and the second portion 31B intersect with each other via a first connecting portion 31C.

The first portion 31A of the present embodiment extends substantially horizontally between the first inlet 34 and the first connecting portion 31C, for example. The second portion 31B of the present embodiment extends substantially vertically between the first connecting portion 31C and the first outlet 35, for example. By the first portion 31A and the second portion 31B configured as such, the first flow path 31 of the present embodiment is formed in an L-shape. Thereby, the first flow path 31 can change (bend) the flow direction of the compressed air (C) supplied from the first inlet 34 at the first connecting portion 31C to let the compressed air (C) flow to the first outlet 35, for example. The first portion 31A and the second portion 31B of the present embodiment are formed to have substantially the same inner diameter R1 (shown in FIG. 3) except for the first inlet 34, for example.

(Second Flow Path)

The second flow path 32 of the present embodiment extends between a second inlet 36 opened in the container 11 and a second outlet 37 for taking out the puncture repair liquid 14 from the extraction cap 12 to supply to the punctured tire 5 (shown in FIG. 1) to be repaired.

The second inlet 36 of the present embodiment is formed as an annular hole provided between the boss portion 21 and the rib portion 22. This second inlet 36 communicates with the first outlet 35 via the space 13 of the container 11 when an internal cap 41 described later is moved to the space 13 of the container 11 (that is, the internal cap 41 is removed), for example.

The second outlet 37 of the present embodiment is formed in a second nozzle portion 40 protruding from the outer peripheral surface (19*a*) of the base portion 19, for example. The second outlet 37 (second nozzle portion 40) is to be connected to the hose 4 (shown in FIG. 1) connected to the punctured tire 5 to be repaired, for example.

With the second inlet 36 and the second outlet 37 configured as such, the second flow path 32 of the present embodiment allows the puncture repair liquid 14 contained in the container 11 to flow from the second inlet 36 to the second outlet 37. As a result, the puncture repair liquid 14 can be supplied to the punctured tire 5 (shown in FIG. 1) to be repaired.

The second flow path 32 of the present embodiment includes a third portion 32A and a fourth portion 32B. The third portion 32A and the fourth portion 32B intersect with each other via a second connecting portion 32C.

The third portion 32A of the present embodiment extends substantially vertically, for example, between the second inlet 36 and the second connecting portion 32C. The fourth portion 32B of the present embodiment extends substantially horizontally, for example, between the second connecting portion 32C and the second outlet 37. By the third portion 32A and the fourth portion 32B configured as such, the second flow path 32 of the present embodiment is formed in an L-shape. Thereby, the second flow path 32 can change (bend) the flow direction of the puncture repair liquid 14 supplied from the second inlet 36 at the second connecting portion 32C to let the puncture repair liquid 14 flow to the second outlet 37, for example. The fourth portion 32B of the present embodiment is configured to have an inner diameter larger than an inner diameter of the third portion 32A, for example.

(Third Flow Path)

The third flow path 33 of the present embodiment communicates the first flow path 31 and the second flow path 32 outside the space 13 of the container 11 (inside the extraction cap 12 in the present example). The third flow path 33 configured as such allows a part of the compressed air (C) in the first flow path 31 to flow to the second flow path 32 without going through the space 13 of the container 11.

The third flow path 33 of the present embodiment extends substantially horizontally between the first connecting portion 31C of the first flow path 31 and the second connecting portion 32C of the second flow path 32, for example. Therefore, in the present embodiment, the first portion 31A of the first flow path 31, the fourth portion 32B of the second flow path 32, and the third flow path 33 are arranged to form a straight line. As a result, the third flow path 33 can allow a part of the compressed air (C) in the first flow path 31 to smoothly flow to the second flow path 32.

(Internal Cap)

The first outlet 35 and the second inlet 36 of the present embodiment are separated from the space 13 of the container 11 by the internal cap 41. The internal cap 41 of the present embodiment is detachably attached to the boss portion 21 and the rib portion 22 of the extraction cap 12, for example.

As shown in FIG. 3, the internal cap 41 of the present embodiment includes a first portion 41A, a second portion 41B, a third portion 41C, and a fourth portion 41D. The internal cap 41 of the present embodiment is formed in a cylindrical shape capable of accommodating the boss portion 21 and the rib portion 22.

The first portion 41A of the present embodiment is for covering the first outlet 35 (the one end (upper end) (21t) of the boss portion 21). The first portion 41A is formed in a conical shape, for example. The second portion 41B of the present embodiment is for covering the one end (21t) side portion of the outer peripheral surface (21a) of the boss portion 21, for example. The second portion 41B is formed in a cylindrical shape, for example.

The third portion 41C of the present embodiment is for covering the other end side (bottom surface (20b) side of the recessed portion 20) portion of the outer peripheral surface (21a) of the boss portion 21 and the rib portion 22. The third portion 41C is formed in a cylindrical shape, for example. The third portion 41C of the present embodiment is formed to have an inner diameter larger than an inner diameter of the second portion 41B.

The fourth portion 41D in the present embodiment extends between the second portion 41B and the third portion 41C, for example. The fourth portion 41D of the present embodiment has an inner diameter gradually and continuously decreasing from the third portion 41C to the second portion 41B, and thus is formed in a tapered shape, for example.

The internal cap 41 of the present embodiment is provided with a ridge portion 42 protruding inward in a radial direction of the internal cap 41 on an inner peripheral surface (41a) of the internal cap 41. The ridge portion 42 of the present embodiment includes a first ridge portion 42A and a second ridge portion (another ridge portion) 42B. The first ridge portion 42A and the second ridge portion 42B are continuously formed in a circumferential direction of the internal cap 41.

The first ridge portion 42A of the present embodiment protrudes toward the boss portion 21 (radially inward of the internal cap 41). The first ridge portion 42A in the present embodiment is fitted into the concave groove 25 of the boss portion 21. This allows the first ridge portion 42A to secure the internal cap 41 to the boss portion 21 while sealing between the internal cap 41 and the boss portion 21. It should be noted that the boss portion 21 may be provided with a ridge portion protruding radially outward and the internal cap 41 may be provided with a concave groove recessed radially outward.

The second ridge portion 42B of the present embodiment protrudes toward the rib portion 22 (radially inward of the internal cap 41). The second ridge portion 42B of the present embodiment is in contact with an outer peripheral surface (22a) of the rib portion 22 over the entire circumference thereof. This allows the second ridge portion 42B to secure the internal cap 41 to the rib portion 22 while sealing between the internal cap 41 and the rib portion 22. It should be noted that the second ridge portion may be provided on the outer peripheral surface of the rib portion 22 to be in contact with the inner peripheral surface of the internal cap 41. It should be noted that the second ridge portion may be provided on the outer peripheral surface (22a) of the rib portion 22 instead to be in contact with the inner peripheral surface (41a) of the internal cap 41, specifically the inner peripheral surface of the third portion 41C.

In this way, the internal cap 41 of the present embodiment is fixed to the boss portion 21 and the rib portion 22, therefore, the first outlet 35 and the second inlet 36 can be separated from the space 13 of the container 11. As a result, the internal cap 41 can prevent the puncture repair liquid 14 from leaking out of the container 11 during storage before puncture repair, for example. The first portion 41A, the second portion 41B, the third portion 41C, and the fourth portion 41D (i.e., the internal cap 41 in the present embodiment) may be collectively referred to as a second cylindrical portion.

(Workings of Puncture Repair Liquid Unit and Puncture Repair Kit)

Next, workings of the puncture repair liquid unit 2 and the puncture repair kit 1 of the present embodiment will be described. In the present embodiment, first, as shown in FIG. 1, the puncture repair liquid unit 2 and the compressor device 3 are connected, and the valve 6 of the punctured tire 5 and the hose 4 are connected. Next, the compressor device 3 starts generating the compressed air (C) (shown in FIG. 2). This allows the puncture repair liquid unit 2 (the puncture repair kit 1) of the present embodiment to supply the compressed air (C) to the first inlet 34 and to flow the compressed air (C) into the first flow path 31 (the first portion 31A) as shown in FIG. 2.

The compressed air (C) flowing in the first flow path 31 (the first portion 31A) splits into the second portion 31B of the first flow path 31 and the third flow path 33 at the first connecting portion 31C. The compressed air (C) flowing in the third flow path 33 flows in the second flow path 32 (the fourth portion 32B) without going through the space 13 of the container 11.

On the other hand, the compressed air (C) flowing into the second portion 31B of the first flow path 31 flows out of the first outlet 35 into a space 43 enclosed by the internal cap 41, the boss portion 21, and the rib portion 22, causing the internal cap 41 to expand. Due to the expansion of the internal cap 41, in the present embodiment, the fixation between the internal cap 41 and the boss portion 21 and the rib portion 22 can be released, and the internal cap 41 can be moved away from the first outlet 35 and the second inlet 36 into the space 13 of the container 11.

Figure 4:
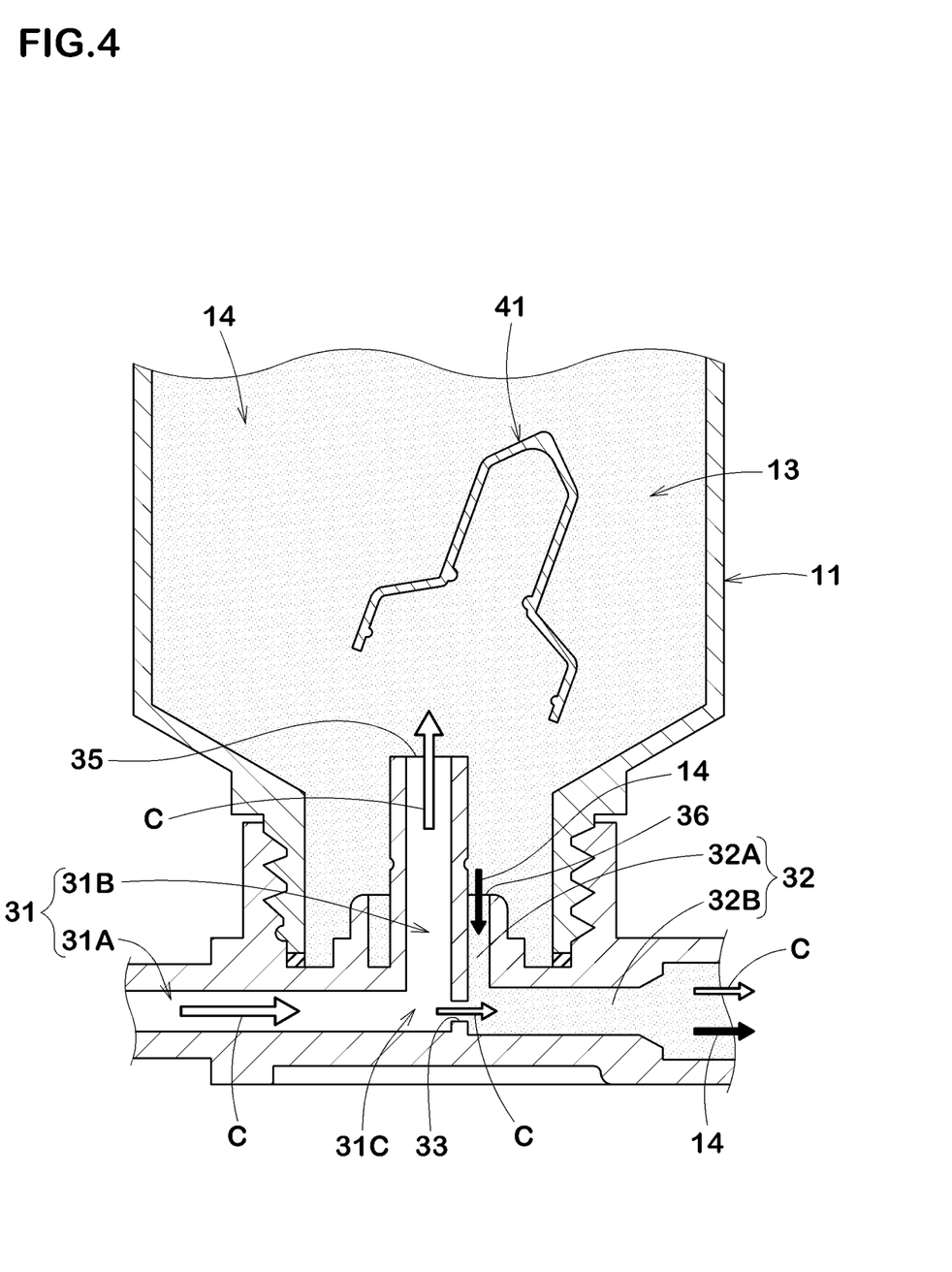
FIG. 4 is a partial cross-sectional view showing the puncture repair liquid unit in which an internal cap is moved into a space inside a container.

FIG. 4 is a cross-sectional view showing the puncture repair liquid unit 2 in which the internal cap 41 is moved into the space 13. In the present embodiment, the compressed air (C) can be supplied to the space 13 inside the container 11 by the movement of the internal cap 41. Further, it is possible that the first outlet 35 and the second inlet 36 communicate with the space 13 in the present embodiment.

In the puncture repair liquid unit 2 (the puncture repair kit 1) of the present embodiment, the puncture repair liquid 14 contained in the container 11 can flow from the second inlet 36 to the second outlet 37 (shown in FIG. 2) by supplying the compressed air (C) to the space 13 of the container 11. Thereby, in the present embodiment, the puncture repair liquid 14 can be taken out from the extraction cap 12 and supplied to the punctured tire 5 (shown in FIG. 1) to be repaired.

Further, in the present embodiment, since a part of the compressed air (C) in the first flow path 31 flows to the second flow path 32 via the third flow path 33, the pressure of the compressed air (C) supplied to the container 11 from the first flow path 31 (the second portion 31B) can be reduced compared to the conventional unit. As a result, the puncture repair liquid unit 2 (the puncture repair kit 1) of the present embodiment can gradually supply the puncture repair liquid 14 to the punctured tire 5 unlike conventional units in which the puncture repair liquid 14 is supplied to the punctured tire 5 (shown in FIG. 1) all at once.

As a result of diligent research by the disclosers, it was found that in the conventional unit in which the puncture repair liquid 14 is supplied at once, a part of the puncture repair liquid 14 tends to solidify near the valve 6 (shown in FIG. 1) of the punctured tire 5, which subsequently causes blocking of a part of the compressed air (C) supply path. This tendency is more pronounced in a high temperature environment (50 to 70° C., for example, including operation and storage environments). Due to such blockage of the supply path, there has been a problem that it takes a lot of time to supply the compressed air (C) to the punctured tire 5.

On the other hand, the puncture repair liquid unit 2 (the puncture repair kit 1) of the present embodiment can gradually supply the puncture repair liquid 14 to the punctured tire 5 (shown in FIG. 1), and therefore it is possible that the puncture repair liquid 14 is prevented from hardening near the valve 6 (shown in FIG. 1). As a result, in the present embodiment, the compressed air (C) can be stably supplied to the punctured tire 5.

Further, in the present embodiment, since a part of the compressed air (C) in the first flow path 31 can be flowed to the second flow path 32 via the third flow path 33, it is possible that the compressed air (C) is supplied together with the puncture repair liquid 14 to the punctured tire 5. As a result, the puncture repair liquid unit 2 (the puncture repair kit 1) of the present embodiment can shorten the supply time of the compressed air (C) to the punctured tire 5.

The first flow path 31 of the present embodiment allows the compressed air (C) supplied from the first inlet 34 (shown in FIG. 2) to change (bend) the flow direction of the compressed air (C) at the first connecting portion 31C to flow to the first outlet 35. Further, the third flow path 33 of the present embodiment allows a part of the compressed air (C) in the first flow path 31 to linearly flow to the second flow path 32. As a result, in the present embodiment, the pressure of the compressed air (C) supplied from the first flow path 31 to the container 11 can be effectively prevented from becoming higher than necessary, therefore, it is possible that the puncture repair liquid 14 is more reliably prevented from being supplied all at once.

As shown in FIG. 3, it is preferred that the third flow path 33 is formed to have an inner diameter R3 smaller than the inner diameter R1 of the first flow path 31. Thereby, the amount of the compressed air (C) flowing from the third flow path 33 to the second flow path 32 can be prevented from become excessively large, thereby, it is possible that the pressure of the compressed air (C) in the first flow path 31 (the second portion 31B) is prevented from decreasing more than necessary. As a result, in the present embodiment, for example, during puncture repair in a low temperature environment (for example, −30° C. or lower), the internal cap 41, which tends to be strongly fixed, can be easily moved, therefore, it is possible that the supply time of the compressed air (C) is shortened. The inner diameter R3 is the maximum diameter of the third flow path 33 and the inner diameter R1 is the maximum diameter of the first flow path 31 (excluding the first inlet 34) in the present embodiment.

It is preferred that a ratio (R1/R3) of the inner diameters is set in the range of 1.25 or more and 3.50 or less. By setting the ratio (R1/R3) to 1.25 or higher, the pressure of the compressed air (C) supplied to the space 13 inside the container 11 can be prevented from decreasing more than necessary, thereby, the internal cap 41 can be easily moved when repairing a flat tire in a low temperature environment. On the other hand, by setting the ratio (R1/R3) to 3.50 or lower, the pressure of the compressed air (C) supplied to the space 13 inside the container 11 can be prevented from becoming larger than necessary, thereby, it is possible that the puncture repair liquid 14 is prevented from solidifying near the valve 6. From this point of view, the ratio (R1/R3) is preferably 1.75 or more, and preferably 2.80 or less.

(Puncture Repair Liquid Unit (Second Embodiment))

Figure 5:
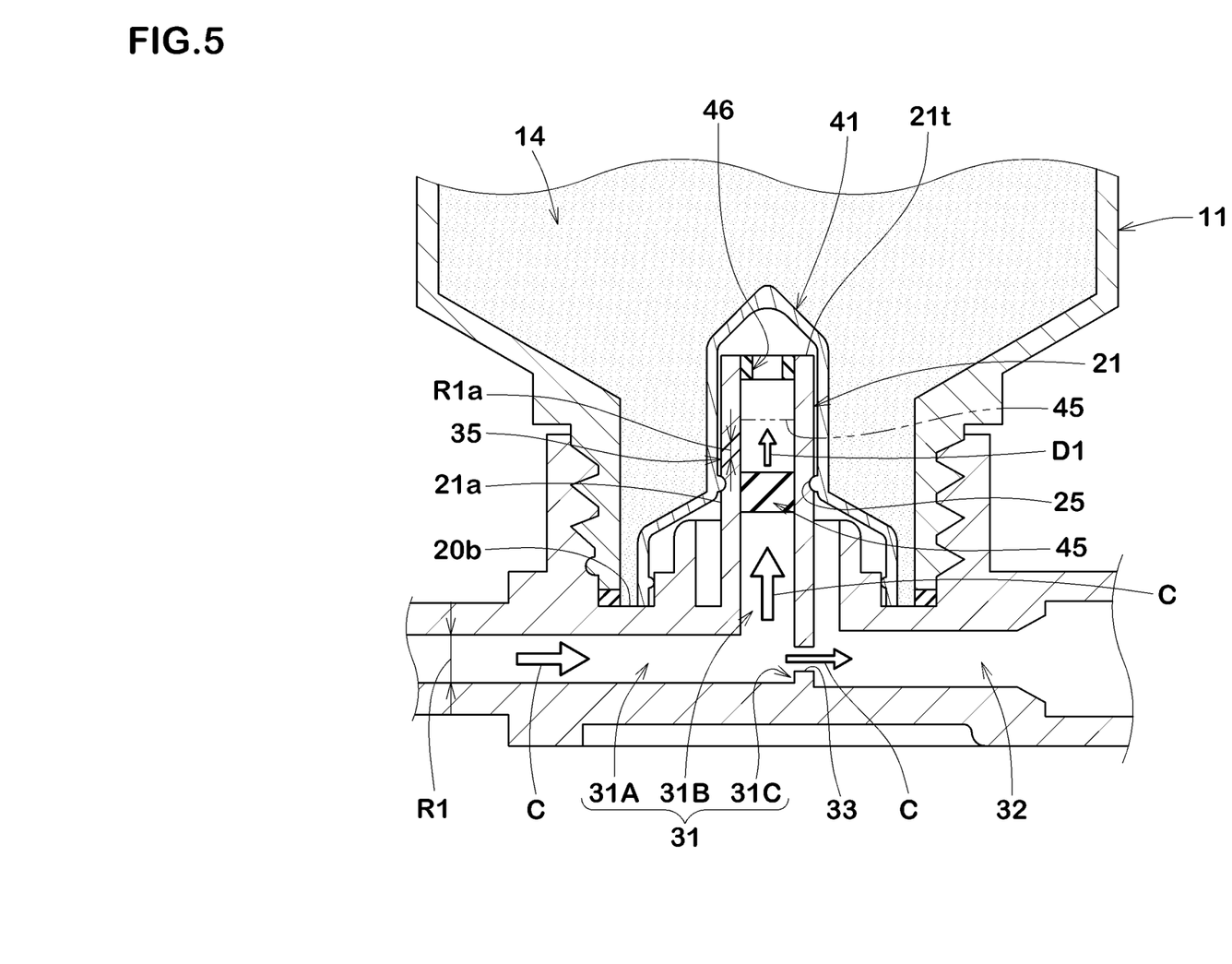
FIG. 5 is a partial cross-sectional view of the puncture repair liquid unit according to another embodiment of the present disclosure.

FIG. 5 is a cross-sectional view of the puncture repair liquid unit 2 according to another embodiment of the present disclosure. The same configurations as those of the previous embodiment are indicated by the same reference signs, and the description thereof may be omitted.

The first outlet 35 of this embodiment is formed as a hole opened in the outer peripheral surface (21a) of the boss portion 21. The first outlet 35 of this embodiment is inclined toward the bottom surface (20b) of the recessed portion 20 as it goes from the first flow path 31 (the second portion 31B in this embodiment) to the outer peripheral surface (21a). Further, the first outlet 35 is provided between the one end (21t) and the concave groove 25 of the boss portion 21. In this embodiment, one first outlet 35 is provided, but a plurality of the first outlets (not shown) may be provided.

The first flow path 31 of this embodiment is provided with a closure 45 that closes (blocks) the first flow path 31 between the first outlet 35 and the first inlet 34 (shown in FIG. 2). The closure 45 is formed in a cylindrical shape centered on an axial center (not shown) extending in the vertical direction, and is press-fitted into the first flow path 31 (the second portion 31B in this embodiment).

Since the closure 45 of this embodiment is arranged between the first outlet 35 and the first inlet 34 (shown in FIG. 2), the closure 45 can close the path between the first outlet 35 and the first inlet 34 during storage before puncture repair, for example. Thereby, the closure 45 can prevent the puncture repair liquid 14 from flowing back into the first flow path 31 even if the internal cap 41 comes off due to mishandling, for example.

Figure 6:
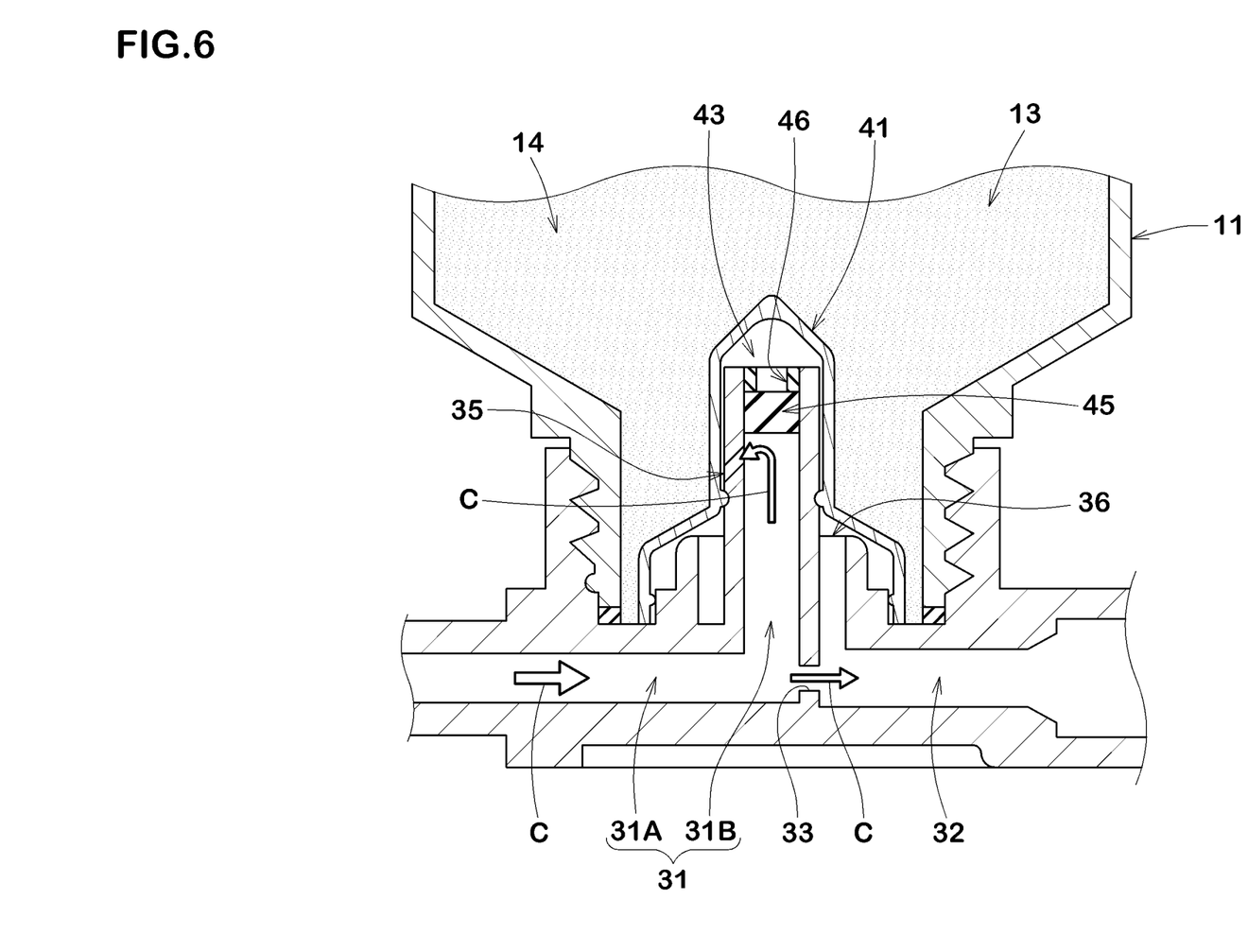
FIG. 6 is a cross-sectional view of the puncture repair liquid unit after a closure is moved.

The closure 45 of this embodiment is moved in a first direction D1 (the longitudinal direction of the second portion 31B (vertical direction) in this embodiment) due to the compressed air (C) flowing through the second portion 31B by the supply of the compressed air (C) to the first inlet 34 at the time of puncture repair. This movement of the closure 45 allows the first inlet 34 (shown in FIG. 2) to communicate with the first outlet 35. In order to ensure smooth movement of the closure 45 in this way, it is preferred that the ratio (R1/R3) of the inner diameters is set in the range of 1.25 or more and 3.50 or less. FIG. 6 is a cross-sectional view of the puncture repair liquid unit 2 after the closure 45 is moved.

Due to the communication between the first inlet 34 (shown in FIG. 2) and the first outlet 35, the compressed air (C) flowing in the second portion 31B flows from the first outlet 35 to the space 43 surrounded by the internal cap 41 and the boss portion 21 and the rib portion 22. Thereby, in this embodiment, it is possible that the internal cap 41 is expanded and moved into the space 13 of the container 11 in the same manner as in the previous embodiment shown in FIG. 4.

The puncture repair liquid unit 2 (the puncture repair kit 1) of this embodiment can supply the compressed air (C) to the space 13 inside the container 11 as in the previous embodiment. Further, it is possible that the first outlet 35 and the second inlet 36 communicate with the space 13. Thereby, in this embodiment, as in the previous embodiment, the puncture repair liquid 14 can be taken out from the extraction cap 12 to supply to the punctured tire 5 (shown in FIG. 1) to be repaired, therefore, it is possible that the supply time of the compressed air (C) to the punctured tire 5 is shortened.

As shown in FIG. 5, it is preferred that an inner diameter (R1a) of the first outlet 35 is set smaller than the inner diameter R1 of the first flow path 31. This allows the pressure of the compressed air (C) supplied from the first outlet 35 to be increased in this embodiment, therefore, the internal cap 41 is reliably moved to the space 13 of the container 11 and it is possible that the puncture repair liquid 14 is gradually supplied to the punctured tire 5.

It is preferred that a ratio (R1a/R1) of the inner diameters is set in the range of 0.2 or more and 0.7 or less. By setting the ratio R1a/R1 to 0.2 or more, it is possible that the puncture repair liquid 14 is gradually supplied to the punctured tire 5 while the internal cap 41 is reliably moved into the space 13 of the container 11. On the other hand, by setting the ratio (R1a/R1) to 0.7 or less, it is possible that the puncture repair liquid 14 is prevented from being supplied to the punctured tire 5 all at once. From such a point of view, the ratio (R1a/R1) is preferably 0.3 or more and preferably 0.6 or less.

As shown in FIGS. 5 and 6, it is preferred that the first flow path 31 is provided with a retaining portion 46 to prevent the closure 45 from moving to the space 13 of the container 11. Thereby, this prevents the puncture repair liquid unit 2 from having an outlet (not shown) larger than the inner diameter (R1a) in the first flow path 31, apart from the first outlet 35. Therefore, in this embodiment, it is possible that the puncture repair liquid 14 is prevented from being supplied to the punctured tire 5 (shown in FIG. 1) at once.

While detailed description has been made of the especially preferred embodiments of the present disclosure, the present disclosure can be embodied in various forms without being limited to the illustrated embodiments.

EXAMPLES

Example A

The puncture repair liquid units and the puncture repair kits having the basic structure shown in FIG. 1 and FIG. 2 and each having the first flow path, the second flow path, and the third flow path were made by way of test (prototyped) (Examples 1 to 6). For comparison, the puncture repair liquid unit and the puncture repair kit not having the third flow path were made by way of test (Reference).

Next, compressed air (350 kPa) was generated by the compressor device and the punctured tires were repaired by using the prototyped puncture repair kits. Then, the presence or absence of the solidification of the puncture repair liquid near the valve, the moving time of the inner cap in a low temperature environment, and the supply time of the compressed air were evaluated. The test methods were as follows. The test results are shown in Table 1.
(Presence or Absence of Solidification of Puncture Repair Liquid)

After storing the prototype puncture repair kits in a high temperature environment (60° C.) for 24 hours, the puncture repair liquid was supplied to the puncture tires. After all the puncture repair liquid was supplied, it was visually confirmed whether or not the puncture repair liquid was solidified near the valve. In the results, one without the solidification of the puncture repair liquid is indicated as "No" and ones with the solidification of the puncture repair liquid are indicated as "Yes".
(Moving Time of Inner Cap)

After storing the prototyped puncture repair kits in a low temperature environment (−40° C.) for 24 hours, compressed air was generated by the compressor device, and the time (duration) until the inner cap was moved into the space of the container was measured for each prototyped kit. The results are graded as follows.

Excellent: moved within 1 minute
Good: moved in 1 to 3 minutes
Fair: moved in 3 to 5 minutes
(Supply Time of Compressed Air)

After the prototype puncture repair kits were stored in a high temperature environment (60° C.) for 24 hours, the time (duration) from the beginning of the supply of the puncture repair liquid to the punctured tire until the punctured tire was inflated to the predetermined internal pressure was measured for each prototype kit. The results are indicated by an index based on Reference being 100, wherein the smaller numerical value is better.

TABLE 1

|  | Ref. | Ex. 1 | Ex. 2 | Ex. 3 | Ex. 4 | Ex. 5 | Ex. 6 |
|---|---|---|---|---|---|---|---|
| Presence or Absence of Third flow path | Absence | Presence | Presence | Presence | Presence | Presence | Presence |
| Inner diameter R1 of First flow path [mm] | 3.5 | 3.5 | 3.5 | 3.5 | 3.5 | 3.5 | 3.5 |
| Inner diameter R3 of Third flow path [mm] | — | 0.5 | 1.0 | 2.0 | 2.8 | 3.5 | 4.0 |
| Ratio (R1/R3) | — | 7.00 | 3.50 | 1.75 | 1.25 | 1.00 | 0.88 |
| Presence or Absence of Solidification of Puncture repair liquid | Presence | Absence | Absence | Absence | Absence | Absence | Absence |
| Moving time of Internal cap | Excellent | Excellent | Excellent | Excellent | Excellent | Good | Fair |
| Supply time of Compressed air [index] | 100 | 90 | 80 | 75 | 79 | 82 | 87 |

From the test results, it was confirmed that the puncture repair liquid can be prevented from solidifying near the valve and thus the supply time of the compressed air to the punctured tires can be shortened in the Examples compared to the Reference. Further, it was confirmed that the moving time of the inner cap under the low temperature environment can be shortened in Examples 2 to 4 in which the ratio (R1/R3) of the inner diameter R3 of the third flow path and the inner diameter R1 of the first flow path was within the preferred range compared to Examples 1, 5, and 6 in which the ratio (R1/R3) was out of the preferred range.

Example B

The puncture repair liquid units and the puncture repair kits having the basic structure shown in FIG. 1 and FIG. 5 and each having the first flow path, the second flow path, the third flow path, and the closure were made by way of test (prototyped) (Examples 7 to 12). Next, compressed air (350 kPa) was generated by the compressor device and the punctured tires were repaired by using the prototyped puncture repair kits. Then, the presence or absence of the solidification of the puncture repair liquid near the valve, and the moving time of the closure in a low temperature environment were evaluated. The test methods were as follows except for the presence or absence of the solidification of the puncture repair liquid near the valve. The test results are shown in Table 2.

(Moving Time of Closure)

After the prototype puncture repair kits were stored in a low temperature environment (−40° C.) for 24 hours, the moving time of the closure was measured from the beginning of the generation of the compressed air by the compressor device until the first inlet communicates with the first outlet. The results are graded as follows.

Excellent: moved within 1 minute
Good: moved in 1 to 3 minutes temperature environment can be shortened in Examples 8 to 10 in which the ratio (R1/R3) of the inner diameter R3 of the third flow path and the inner diameter R1 of the first flow path was within the preferred range compared to Examples 11 and 12 in which the ratio (R1/R3) was out of the preferred range.

Statement of Disclosure

The present disclosure includes the following aspects.

Present Disclosure 1

A puncture repair liquid unit including:

a container containing a puncture repair liquid in a space inside the container; and an extraction cap fixed to a mouth of the container, wherein the extraction cap is provided with a first flow path, a second flow path, and a third flow path, the first flow path extends between a first inlet connectable to an external compressor device for generating compressed air and a first outlet opening in the container, the second flow path extends between a second inlet opening in the container and a second outlet for taking out the puncture repair liquid from the extraction cap to supply to a punctured tire to be repaired, the second inlet communicates with the first outlet via the space of the container, and the third flow path communicates with the first flow path and the second flow path outside the space of the container so that a portion of the compressed air in the first flow path flows into the second flow path.

TABLE 2

|  | Ex. 7 | Ex. 8 | Ex. 9 | Ex. 10 | Ex. 11 | Ex. 12 |
|---|---|---|---|---|---|---|
| Inner diameter R1 of First flow path [mm] | 3.5 | 3.5 | 3.5 | 3.5 | 3.5 | 3.5 |
| Inner diameter R3 of Third flow path [mm] | 0.5 | 1.0 | 2.0 | 2.8 | 3.5 | 4.0 |
| Ratio (R1/R3) | 7.00 | 3.50 | 1.75 | 1.25 | 1.00 | 0.88 |
| Presence or Absence of Solidification of Puncture repair liquid | Absence | Absence | Absence | Absence | Absence | Absence |
| Moving time of Closure | Excellent | Excellent | Excellent | Excellent | Good | Good |
| Supply time of Compressed air [index] | 90 | 80 | 75 | 79 | 82 | 87 |

From the test results, it was confirmed that the puncture repair liquid can be prevented from solidifying near the valve and thus the supply time of the compressed air to the punctured tires can be shortened in Examples 7 to 12 similarly to Examples 1 to 6 of Table 1. Further, it was confirmed that the moving time of the closure under the low Present Disclosure 2

The puncture repair liquid unit according to present disclosure 1, wherein the third flow path has an inner diameter (R3) smaller than an inner diameter (R1) of the first flow path.

Present Disclosure 3

The puncture repair liquid unit according to present disclosure 2, wherein a ratio (R1/R3) of the inner diameter (R1) of the first flow path to the inner diameter (R3) of the third flow path is 1.25 or higher and 3.50 or lower.

Present Disclosure 4

The puncture repair liquid unit according to any one of present disclosures 1 to 3 further comprising an internal cap for separating the first outlet and the second inlet from the space of the container, wherein
the first outlet and the second inlet communicate with the space when the internal cap is moved into the space of the container by the compressed air supplied to the first inlet.

Present Disclosure 5

The puncture repair liquid unit according to present disclosure 4, wherein
the first flow path is provided with a closure for closing the first flow path between the first outlet and the first inlet, and
the first inlet and the first outlet communicate with each other when the closure is moved in a first direction toward the first outlet to pass the first outlet by the compressed air supplied to the first inlet.

Present Disclosure 6

A puncture repair kit including the puncture repair liquid unit according to any one of present disclosures 1 to 5 and 7 to 20 and a compressor device.

Present Disclosure 7

The puncture repair liquid unit according to claim 2, wherein the ratio (R1/R3) of the inner diameter (R1) of the first flow path to the inner diameter (R3) of the third flow path is 1.75 or higher and 2.80 or lower.

Present Disclosure 8

The puncture repair liquid unit according to present disclosure 4, wherein
the extraction cap includes a first cylindrical portion protruding in a direction from the mouth to further inside of the container,
the extraction cap includes a second cylindrical portion for covering the first cylindrical portion,
the first inlet and the second inlet are provided in the first cylindrical portion,
the first cylindrical portion has an outer peripheral surface provided with one of a concave groove and a ridge portion extending continuously in a circumferential direction of the first cylindrical portion in a ring shape,
the second cylindrical portion has an inner peripheral surface provided with the other of the concave groove and the ridge portion extending continuously in a circumferential direction of the second cylindrical portion in a ring shape, and
the one and the other of the concave groove and the ridge portion are detachably fitted with each other before the compressed air is supplied to the first inlet.

Present Disclosure 9

The puncture repair liquid unit according to present disclosure 8, wherein
the one of the concave groove and the ridge portion is provided in the first cylindrical portion between the first outlet and the second inlet, and
the first outlet opens in a space surrounded by the first cylindrical portion and the second cylindrical portion with the one and the other of the concave groove and the ridge portion being fitted with each other.

Present Disclosure 10

The puncture repair liquid unit according to present disclosure 9, wherein
one of the outer peripheral surface of the first cylindrical portion and the inner peripheral surface of the second cylindrical portion is provided with another ridge portion extending continuously in the circumferential direction in a ring shape,
said another ridge portion is in contact with the other of the outer peripheral surface of the first cylindrical portion and the inner peripheral portion of the second cylindrical portion over the entire circumference thereof, and
the second inlet is arranged between the one of the concave groove and the ridge portion and said another ridge portion.

Present Disclosure 11

The puncture repair liquid unit according to present disclosure 1, wherein
the first flow path has a first portion and a second portion,
the first portion includes the first inlet and extends linearly,
the second portion includes the first outlet and extends linearly, and
the first portion and the second portion are connected via a first connecting portion in an L-shape.

Present Disclosure 12

The puncture repair liquid unit according to present disclosure 11, wherein
the second flow path has a third portion and a fourth portion,
the third portion includes the second inlet and extends linearly,
the fourth portion includes the second outlet and extends linearly, and
the third portion and the fourth portion are connected via a second connecting portion in an L-shape.

Present Disclosure 13

The puncture repair liquid unit according to present disclosure 12, wherein
the third flow path communicate with the first portion and the fourth portion, and the first portion, the third flow path, and the fourth portion are arranged to form a single liner line.

Present Disclosure 14

The puncture repair liquid unit according to present disclosure 9, wherein the first outlet is formed at a protruding end of the first cylindrical portion.

Present Disclosure 15

The puncture repair liquid unit according to present disclosure 9, wherein
the first flow path is provided with a closure for closing the first flow path between the first outlet and the first inlet,
the first inlet and the first outlet communicate with each other when the closure is moved in a first direction toward the first outlet to pass the first outlet by the compressed air supplied to the first inlet, and
the first outlet is formed as a through hole penetrating between an inner peripheral surface and the outer peripheral surface of the first cylindrical portion and arranged between a protruding end of the first cylindrical portion and the one of the concave groove and the ridge portion.

Present Disclosure 16

The puncture repair liquid unit according to present disclosure 15, wherein the first outlet is inclined in a direction away from the protruding end as it goes radially outward.

Present Disclosure 17

The puncture repair liquid unit according to present disclosure 15, wherein the first cylindrical portion is provided with a plurality of the first outlets.

Present Disclosure 18

The puncture repair liquid unit according to present disclosure 15, wherein the first outlet has an inner diameter (Ria) smaller than an inner diameter (R1) of the first flow path.

Present Disclosure 19

The puncture repair liquid unit according to present disclosure 18, wherein a ratio (R1a/R1) of the inner diameter (R1a) of the first outlet to the inner diameter (R1) of the first flow path is 0.2 or higher and 0.7 or lower.

Present Disclosure 20

The puncture repair liquid unit according to present disclosure 15, wherein
the first cylindrical portion is provided with a retaining portion for stopping the movement of the closure, and
the retaining portion is arranged on the protruding end side with respect to the first outlet.

DESCRIPTION OF THE REFERENCE SIGNS 1 puncture repair kit
2 puncture repair liquid unit
3 compressor device
5 punctured tire
11 container
12 extraction cap
14 puncture repair liquid
31 first flow path
32 second flow path
33 third flow path

The invention claimed is:

1. A puncture repair liquid unit comprising:
a container containing a puncture repair liquid in a space inside the container; and
an extraction cap fixed to a mouth of the container,
wherein the extraction cap is provided with a first flow path, a second flow path, and a third flow path,
the first flow path extends between a first inlet connectable to an external compressor device for generating compressed air and a first outlet opening in the container,
the second flow path extends between a second inlet opening in the container and a second outlet for taking out the puncture repair liquid from the extraction cap to supply to a punctured tire to be repaired,
the second inlet communicates with the first outlet via the space of the container,
the third flow path communicates with the first flow path and the second flow path outside the space of the container so that a portion of the compressed air in the first flow path flows into the second flow path, and
the first outlet is located more inwardly in the container relative to the mouth than the second inlet.

2. The puncture repair liquid unit according to claim 1 further comprising an internal cap for separating the first outlet and the second inlet from the space of the container, wherein
the first outlet and the second inlet communicate with the space when the internal cap is moved into the space of the container by the compressed air supplied to the first inlet.

3. The puncture repair liquid unit according to claim 2, wherein the internal cap consists of a first portion, a second portion, a third portion, and a fourth portion, and
the first portion is located innermost of the container among the first, second, third, and fourth portions, and is formed in a conical shape having a diameter continuously decreasing in a direction from the mouth to the inside of the container in a state in which the first outlet and the second inlet are separated from the space of the container by the internal cap.

4. The puncture repair liquid unit according to claim 2, wherein the first flow path is provided with a closure for closing the first flow path between the first outlet and the first inlet, and
the first inlet and the first outlet communicate with each other when the closure is moved in a first direction toward the first outlet to pass the first outlet by the compressed air supplied to the first inlet.

5. The puncture repair liquid unit according to claim 2, wherein the extraction cap includes a first cylindrical portion protruding in a direction from the mouth to further inside of the container,
the extraction cap includes a second cylindrical portion for covering the first cylindrical portion,
the first inlet and the second inlet are provided in the first cylindrical portion,
the first cylindrical portion has an outer peripheral surface provided with one of a concave groove and a ridge portion extending continuously in a circumferential direction of the first cylindrical portion in a ring shape, the second cylindrical portion has an inner peripheral surface provided with the other of the concave groove and the ridge portion extending continuously in a circumferential direction of the second cylindrical portion in a ring shape, and the one and the other of the concave groove and the ridge portion are detachably fitted with each other before the compressed air is supplied to the first inlet.

6. The puncture repair liquid unit according to claim 5, wherein the one of the concave groove and the ridge portion is provided in the first cylindrical portion between the first outlet and the second inlet, and the first outlet opens in a space surrounded by the first cylindrical portion and the second cylindrical portion with the one and the other of the concave groove and the ridge portion being fitted with each other.

7. The puncture repair liquid unit according to claim 6, wherein one of the outer peripheral surface of the first cylindrical portion and the inner peripheral surface of the second cylindrical portion is provided with another ridge portion extending continuously in the circumferential direction in a ring shape, said another ridge portion is in contact with the other of the outer peripheral surface of the first cylindrical portion and the inner peripheral portion of the second cylindrical portion over the entire circumference thereof, and the second inlet is arranged between the one of the concave groove and the ridge portion and said another ridge portion.

8. The puncture repair liquid unit according to claim 6, wherein the first outlet is formed at a protruding end of the first cylindrical portion.

9. The puncture repair liquid unit according to claim 6, wherein the first flow path is provided with a closure for closing the first flow path between the first outlet and the first inlet, the first inlet and the first outlet communicate with each other when the closure is moved in a first direction toward the first outlet to pass the first outlet by the compressed air supplied to the first inlet, and the first outlet is formed as a through hole penetrating between an inner peripheral surface and the outer peripheral surface of the first cylindrical portion and arranged between a protruding end of the first cylindrical portion and the one of the concave groove and the ridge portion.

10. The puncture repair liquid unit according to claim 9, wherein the first cylindrical portion is provided with a retaining portion for stopping the movement of the closure, and the retaining portion is arranged on the protruding end side with respect to the first outlet.

11. The puncture repair liquid unit according to claim 9, wherein the first outlet is inclined in a direction away from the protruding end as it goes radially outward.

12. The puncture repair liquid unit according to claim 9, wherein the first cylindrical portion is provided with a plurality of the first outlets.

13. The puncture repair liquid unit according to claim 9, wherein the first outlet has an inner diameter (R1a) smaller than an inner diameter (R1) of the first flow path.

14. The puncture repair liquid unit according to claim 13, wherein a ratio (R1a/R1) of the inner diameter (R1a) of the first outlet to the inner diameter (R1) of the first flow path is 0.2 or higher and 0.7 or lower.

15. A puncture repair kit including the puncture repair liquid unit according to claim 1 and a compressor device.

16. The puncture repair liquid unit according to claim 1, wherein the first flow path has a first portion and a second portion, the first portion includes the first inlet and extends linearly, the second portion includes the first outlet and extends linearly, and the first portion and the second portion are connected via a first connecting portion in an L-shape.

17. The puncture repair liquid unit according to claim 16, wherein the second flow path has a third portion and a fourth portion, the third portion includes the second inlet and extends linearly, the fourth portion includes the second outlet and extends linearly, and the third portion and the fourth portion are connected via a second connecting portion in an L-shape.

18. The puncture repair liquid unit according to claim 17, wherein the third flow path communicate with the first portion and the fourth portion, and the first portion, the third flow path, and the fourth portion are arranged to form a single line.

19. A puncture repair liquid unit comprising:

a container containing a puncture repair liquid in a space inside the container;

an extraction cap fixed to a mouth of the container; and an internal cap for separating a first outlet opening in the container and a second inlet opening in the container from the space of the container, wherein the extraction cap is provided with a first flow path, a second flow path, and a third flow path, the first flow path extends between a first inlet connectable to an external compressor device for generating compressed air and the first outlet, the second flow path extends between the second inlet and a second outlet for taking out the puncture repair liquid from the extraction cap to supply to a punctured tire to be repaired, the second inlet communicates with the first outlet via the space of the container, the third flow path communicates with the first flow path and the second flow path outside the space of the container so that a portion of the compressed air in the first flow path flows into the second flow path, the first outlet and the second inlet communicate with the space when the internal cap is moved into the space of the container by the compressed air supplied to the first inlet, the extraction cap includes a first cylindrical portion protruding in a direction from the mouth to further inside of the container, the extraction cap includes a second cylindrical portion for covering the first cylindrical portion, the first inlet and the second inlet are provided in the first cylindrical portion, the first cylindrical portion has an outer peripheral surface provided with one of a concave groove and a ridge portion extending continuously in a circumferential direction of the first cylindrical portion in a ring shape, the second cylindrical portion has an inner peripheral surface provided with the other of the concave groove and the ridge portion extending continuously in a circumferential direction of the second cylindrical portion in a ring shape, the one and the other of the concave groove and the ridge portion are detachably fitted with each other before the compressed air is supplied to the first inlet, the one of the concave groove and the ridge portion is provided in the first cylindrical portion between the first outlet and the second inlet, the first outlet opens in a space surrounded by the first cylindrical portion and the second cylindrical portion with the one and the other of the concave groove and the ridge portion being fitted with each other, the first flow path is provided with a closure for closing the first flow path between the first outlet and the first inlet, the first inlet and the first outlet communicate with each other when the closure is moved in a first direction toward the first outlet to pass the first outlet by the compressed air supplied to the first inlet, and the first outlet is formed as a through hole penetrating between an inner peripheral surface and the outer peripheral surface of the first cylindrical portion and arranged between a protruding end of the first cylindrical portion and the one of the concave groove and the ridge portion.

20. A puncture repair liquid unit comprising:

a container containing a puncture repair liquid in a space inside the container;

an extraction cap fixed to a mouth of the container; and an internal cap for separating a first outlet opening in the container and a second inlet opening in the container from the space inside the container, wherein the extraction cap is provided with a first flow path, a second flow path, and a third flow path, the first flow path extends from a first inlet connectable to an external compressor device for generating compressed air to the first outlet, the second flow path extends from the second inlet to a second outlet for taking out the puncture repair liquid from the extraction cap to supply to a punctured tire to be repaired, the second inlet communicates with the first outlet via the space of the container, the third flow path communicates with the first flow path and the second flow path outside the space of the container so that a portion of the compressed air in the first flow path flows into the second flow path, the first outlet and the second inlet communicate with the space when the internal cap is moved into the space of the container by the compressed air supplied to the first inlet, the extraction cap comprises a closure disposed in the first flow path between the first inlet and the first outlet and configured to close the first flow path between the first inlet and the first outlet, and the first inlet and the first outlet communicate with each other when the closure is moved in a first direction toward the first outlet to pass the first outlet by the compressed air supplied to the first inlet.

\* \* \* \* \*